Jan. 7, 1964 A. CARDARELLI ET AL 3,117,302
ROTATING SIGNAL LIGHT
Filed Oct. 14, 1960 3 Sheets-Sheet 1

INVENTORS
ARMOND CARDARELLI
DAVID O. CHASE
BY PHILLIP H. STEVENS

Richard von K. Bruns
Attorney

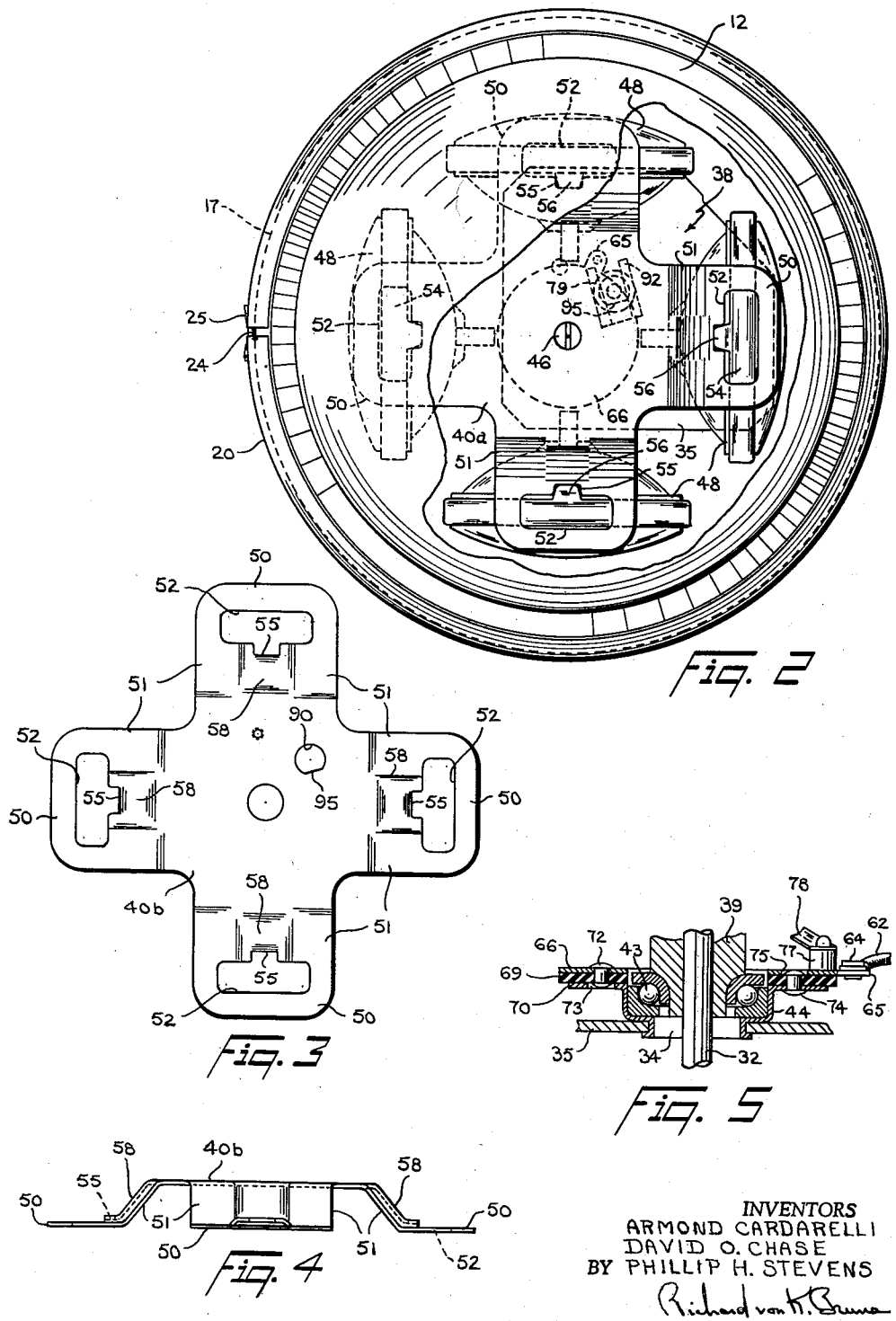

Jan. 7, 1964  A. CARDARELLI ET AL  3,117,302
ROTATING SIGNAL LIGHT
Filed Oct. 14, 1960  3 Sheets-Sheet 3
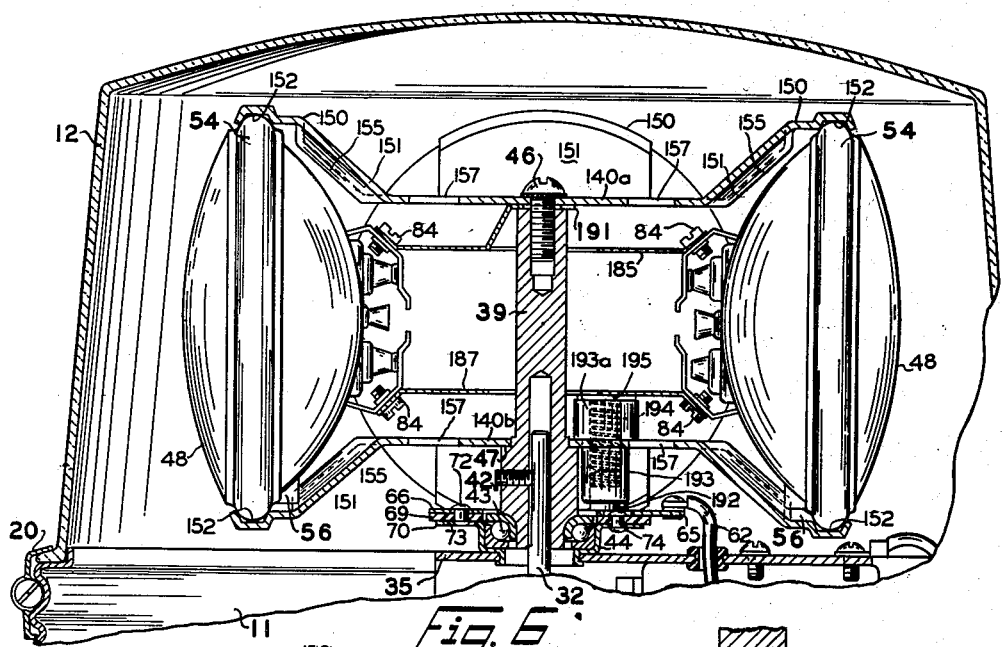
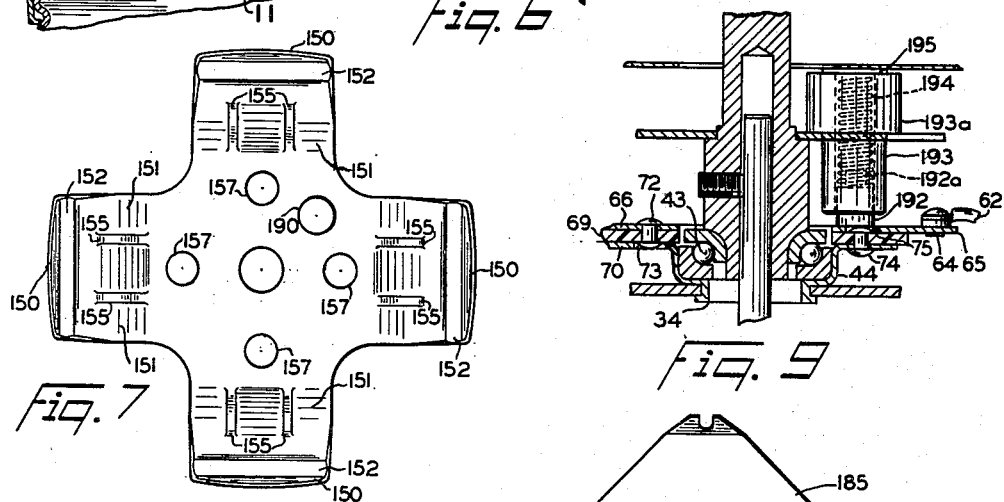
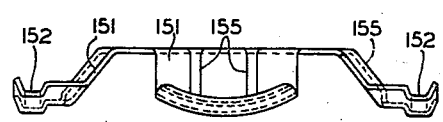
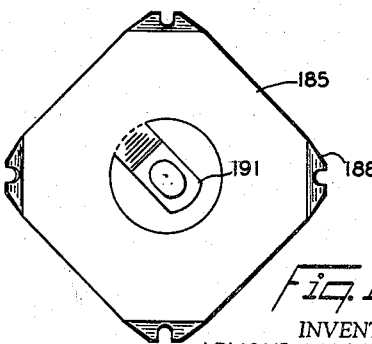
INVENTORS.
ARMOND CARDARELLI
DAVID O. CHASE
PHILLIP H. STEVENS
BY
Richard von K. Bruns
Atty.

United States Patent Office 3,117,302
Patented Jan. 7, 1964

3,117,302
ROTATING SIGNAL LIGHT
Armond Cardarelli, East Syracuse, David O. Chase, Camillus, and Philip H. Stevens, Syracuse, N.Y., assignors to R. E. Dietz Company, Syracuse, N.Y., a corporation of New York
Filed Oct. 14, 1960, Ser. No. 62,798
10 Claims. (Cl. 340—50)

This invention relates generally to signal lights, and has particular reference to an improved construction for a rotating signal or warning light of the type used on police and fire department vehicles, emergency road vehicles, ambulances and the like. This application is a continuation-in-part of copending application Ser. No. 832,219, now abandoned by the same inventors filed August 7, 1959.

Briefly stated, the invention contemplates a signal light which is particularly adapted for use with sealed beam lamps and has a novel rotatable lamp support that can accommodate from one to four such lamps so that the signal characteristics of the light can be varied without the necessity for changing the structure thereof.

Accordingly, it is the broad objective of the invention to provide a signal light of the character described that is highly versatile and at the same time has a simple, economical construction.

Another important object of the invention is to provide a signal light of the character described wherein the sealed beams lamps and lamp support can be removed as a unit from the light without the necessity for disconnecting current carrying wires or the like, said removal facilitating inspection and replacement of the lamps and being accomplished by simply loosening a set screw.

A further important object of the invention is to provide a signal light of the character described which is capable of a high light output and yet has a relatively compact form.

Another important object of the invention is to provide a signal light of the character described having a durable weather-tight housing.

A further important object of the invention is to provide a signal light of the character described which is easy to install and maintain.

Other objects and advantages of the invention will become apparent from the following detailed description thereof read in conjunction with the accompanying drawings which illustrate a representative embodiment of the invention for the purpose of disclosure.

In the drawings:

FIGURE 2 is a top plan view of the light with a portion of the top of the light transmitting dome broken away for clarity;

FIGURE 3 is a top plan view of one of the plate members forming the rotatable lamp support;

FIGURE 4 is a side elevation of the plate member of FIGURE 3;

FIGURE 5 is an enlarged transverse section through the conducting ring and bearing assembly for the lamp support;

FIGURE 6 is a fragmentary vertical section similar to FIGURE 1 showing a modification of the invention;

FIGURE 7 is a plan view of one of the plate members of the modification of FIGURE 6;

FIGURE 8 is a side elevational view of the plate member of FIGURE 7;

FIGURE 9 is an enlarged fragmentary sectional view of certain parts shown at the center of FIGURE 6; and FIGURE 10 is a top plan view of the upper electrical connector ring.

Figure 1:
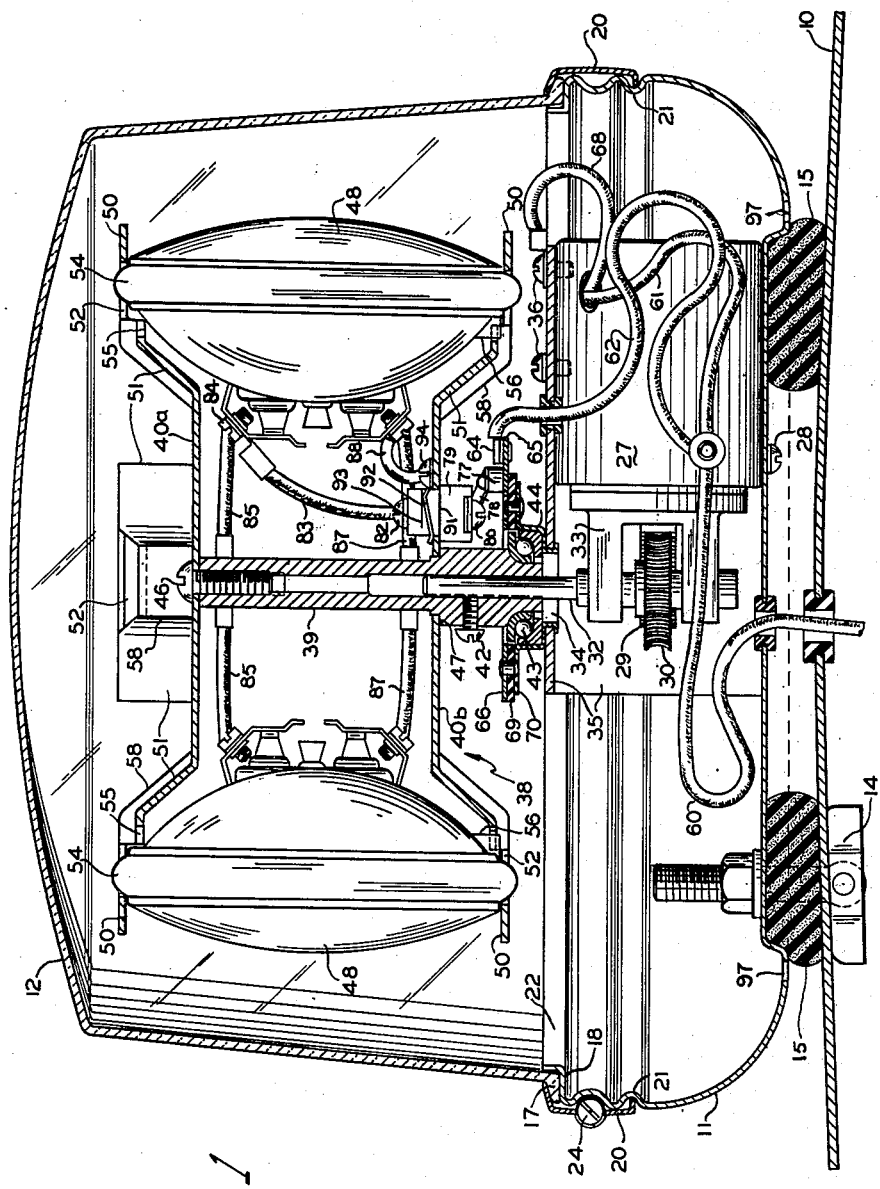
FIGURE 1 is a vertical section taken near the center of a signal light embodying the invention.

Referring now to the drawings, wherein like reference numbers designate the same part in each of the views, and with particular reference to FIGURE 1, the signal light is shown as being mounted on the roof 10 of the automotive vehicle and its external structure or housing is essentially comprised of a pan shaped base member 11 and a light transmitting dome 12. The base is preferably secured to the vehicle roof or top by means of toggle bolts, one of which is shown at 14, and a resilient gasket or pad 15 or rubber or the like is positioned between the base and roof. The toggle bolts permit installation of the signal light without interfering with the upholstery below the mounting surface, and by using three such bolts the device can be adjusted to a substantially level position with the gasket 15 compensating for the curvature or inclination of the roof.

The dome 12 is preferably formed or moulded of colored plastic so that the light emitted is red, blue or any other desired color. The dome forms a closure for the open topped pan base and is provided with an annular flange 17 at its bottom edge which rests on an annular shoulder 18 formed adjacent the upper edge of the base. A detachable bezel or rim 20 engages the flange 17 and a groove 21 formed in the base to secure the parts together, and an annular lip 22 projecting upwardly from the shoulder 18 inside the dome insures a weather-tight connection. The bezel 20 is in the form of a split ring, FIGURE 2, the ends of which are drawn together by a fastening screw 24 and a nut 25 to clamp the bezel in position. For a more detailed description of the bezel and its fastening means, reference may be had to U.S. Patent No. 2,458,007, issued January 4, 1949 to George A. Knapp.

An electric motor 27 is secured as by screws 36 to a motor support bracket 35 which is in turn secured to the bottom of the base member 11 as by screws 28, and a worm 29 on the end of the motor shaft engages a worm wheel 30. The worm wheel 30 is keyed or otherwise fixed to a vertically disposed shaft 32 which is suitably journalled in a bracket 33 secured to the end of the motor. The shaft projects upwardly into the dome of the signal light through an aperture 34 formed in the motor support bracket 35.

Secured to the upper end of shaft 32 for rotation therewith is the lamp holder or support indicated generally at 38. The lamp support comprises a sleeve member 39 and a pair of lamp engaging plate members 40a and 40b which are mounted in spaced relation on the sleeve member and will be described in detail presently. The sleeve 39 is connected to the shaft by means of a set screw 42 that is adapted to engage a flat on the shaft, and at its lower end the sleeve bears against the upper race of a thrust bearing 43. The lower race of the bearing is held in position by retaining cup 44 which is secured to the mounting bracket 35 as by being crimped over the edge of the aperture 34.

The upper plate member 40a of the lamp support 38 is secured to the sleeve member 39 by a screw 46 which is threaded into the upper end thereof, and the lower plate member 40b rests on a shoulder 47 formed near the lower end of the sleeve. The plates 40a, 40b are of substantially identical construction and are adapted to support from one to four sealed beam lamps, indicated at 48 in FIGURES 1 and 2. To this end, the plates have a generally cruciform configuration, being formed with four radially extending arms 50, FIGURES 2 and 3, whereby the lamps 48 are engaged by or clamped between corresponding arms on the two plates.

As best shown in FIGURES 3 and 4 (which illustrate the lower plate 40b), the radially extending arms 50 of the plate are offset as at 51, and each arm is provided with a substantially rectangular opening 52 adjacent its outer end that is adapted to receive a portion of the rim 54 of a lamp 48. The inner side of each opening 52 is also notched as at 55 to receive the locator lug 56 that is formed on every sealed beam lamp. However, because the lugs 56 are located inwardly from the rims of the lamps, the arms 50 are further offset as at 58 in the area adjacent the notches so that the sides thereof will engage the sides of the locator lugs, as indicated in FIGURE 1, to prevent rotation of the lamps about their horizontal axes.

The upper plate 40a is constructed in the same manner as the lower plate and is simply turned over when mounted on the sleeve member 39 so that the offset portions of the plates diverge as shown in FIGURE 1. The upper plate, however, need not have certain openings that are provided in the lower plate for electrical connections as will be presently described. Since the conventional sealed beam lamp has but a single locator lug, only one of the notches 55 in each pair of confronting plate arms 50 will normally be used although it makes no difference whether the lug engages the notch in the lower plate as shown in FIGURE 1 or upper plate as shown in FIGURE 2. By making the upper and lower plates identical except for electrical fitting holes, various obvious economies are obtained in the manufacture of the signal light.

The current for the motor 27 and lamps 48 is derived from any suitable current source and is brought into the base 11 of the signal light by a single conductor 60, the base being grounded to the vehicle roof through the toggle bolts to form the return side of the circuit. Within the base, the conductor 60 is connected to one of the motor leads 61 and also to a lead 62 which is secured as by a rivet or screw 64 to a tab 65 on an annular contact plate or slip-ring 66. The other motor lead 68 is grounded on the motor support 35 by means of one of the screws 36.

The slip-ring 66, FIGURES 1 and 5, encircles the sleeve member 39 in spaced relation thereto and is supported by a ring 69 of insulating material which is in turn supported by an annular flange 70 at the upper edge of the bearing retaining cup 44. To this end, the slip-ring is secured as by rivets 72 to the insulating ring 69, and at these points the flange 70 is formed with clearance holes 73 having a larger diameter than that of the rivet heads so as to be insulated therefrom, see FIGURE 5. Similarly, the insulating ring is secured as by rivets 74 to the flange, and at these points the contact ring is formed with clearance holes 75, whereby the ring is completely insulated from its supporting structure.

From the slip-ring 66 current is delivered to the lamps 48 through a brush 77 which is adapted to ride around on the ring as the lamp support rotates, the brush being carried by a spring metal strip 78 that biases the brush into engagement with the ring. Strip 78 is supported by an insulator member 79 that passes through the lower lamp support plate 40b and encircles a tubular conductor (not shown) to which the strip may be connected as by a screw 80. Above the plate 40b, the tubular conductor is connected as by a screw 82 to a lead 83 which goes to the upper terminal 84 of one of the lamps 48. The upper terminals of the other lamps are also connected by the lead 83 by means of leads 85, and the lower terminals of the lamps are connected together by leads 87 and thence to ground through a lead 88.

The insulator member 79 is positioned in a close fitting aperture 90 in the lower plate 40b with a shoulder 91 on the member abutting against the underside of the plate, see FIGURES 1-3. The member is maintained in this position by a forked spring 92 having tines which are received in grooves 93 formed on opposite sides of the member. Screw 94 serves as a ground connection for the lead 88 from the lamps. To prevent rotation of the insulator member in the aperture 91, the parts are formed with corresponding flattened portions indicated at 95 in FIGURES 2 and 3.

Since sealed beam lamps generate a considerable amount of heat if left on for any length of time, ventilation holes 97 are provided at the bottom of the base 11 adjacent the mounting gasket 15, these holes also serving as drain holes for any condensation that may occur within the lamp.

Referring now to FIGURES 6-9, a modified form of the invention is shown as comprising a pan shaped base member 11, a translucent dome 12, a bezel 20, support bracket 35, vertical shaft 32, bearing 43, retaining cup 44, slip-ring 66, sleeve member 39 and lamps 48, all as hereinabove more particularly described.

The upper lamp engaging plate member 140a is secured to the top of sleeve 39 by the screw 46 and the lower plate member 140b rests on the shoulder 47 of the sleeve 39. Plate members 140a and 140b are of substantially identical construction, the only difference being in the size of the hole at the center. As best seen in FIGURES 7 and 8, which are representations of lower plate 140b, the plates are of a generally cruciform configuration, being formed by stamping or otherwise with four radially extending arms 150, the terminal portions of which are offset at 151 from the central portion of the plate. Each arm 150 is provided with a curved groove 152 for engagement with the annular rim 54 of a lamp 48.

When the plates 140a and 140b are mounted on sleeve 39, FIGURE 6, they are oppositely disposed and the offset portions diverge and the annular groove 152 of each arm 150, which conforms inversely to the rim 54 of lamp 48, faces a corresponding groove in the other plate so that a lamp may be secured therebetween.

On each arm 150, inward of the groove 152, two spaced ribs 155 offset oppositely from the offset at 151 provide shoulders on either side of the locator lug 56 on lamp 48 so that the lamp may be correctly positioned. An access hole 157 is also provided in each arm 150 for easy access to the terminal screws 84 on each lamp.

Lower plate 140b is also provided with a brush hole 190 for a purpose hereinafter more fully explained.

Between the plates 140a and 140b, FIGURE 6, electrical connector rings 185 and 187 connect the like electrical terminals at 84 of the 4 lamps. These connector rings are provided with a central hole so that they may be spaced from sleeve 39 as shown in FIGURE 6. They may conveniently be simply square metal plates with tab portions 188 turned up at each corner as shown in FIGURE 10 and appropriately slotted or pierced for the screw 84.

The upper connector ring 185 is also provided with another centrally located tab at 191 as shown for grounding one terminal of each lamp to sleeve 39, the tab being secured by the screw 46.

In FIGURE 9 is clearly shown the brush 192, and brush holder 193, for supplying electrical current from the slip-ring or contact plate 66 to the other terminals of the lamps. Brush holder 193 is of insulating material and is tubular so that the brush 192 may slide up and down inside. It is provided with an enlarged upper or head portion 193a so that the lower portion, conforming inversely to the hole 190 in lower plate 140b, may be dropped in the hole 190 and the head portion is supported by the plate.

The metal brush 192 is provided with an upper reduced portion 192a so that a coil spring 194, freely slidable in the brush holder 193, may be secured thereover. A metal contact disc 195 is secured as by soldering to the upper end of spring 194. Disc 195 is larger than the central hole in the brush holder so that it retains spring 194 and brush 192 within brush holder 193 when the support assembly is removed from the light.

During operation of the light, of course, spring 194 serves to keep the brush 192 in contact with the slip-ring 66 and disc 195 in contact with the connector ring 187 as shown.

From the foregoing description it will be apparent that the signal light of the invention provides a very practical arrangement for permitting selective use of from one to four sealed beam lamps, whereby the flash rate of the light can be increased as the number of lamps is increased for a given speed of rotation of the drive shaft 32. In addition, the light is constructed so that it is a relatively simple matter to change the number of lamps or to replace a burned out lamp, it being necessary only to release the bezel screw 24 and lift off the dome for access to the interior of the light. Thereafter, by simply backing off on the screw 46, the upper plate 40a can be raised out of clamping engagement with the lamp or lamps to enable the necessary changes to be made, and this can be accomplished without removing any part of the light assembly from the vehicle top or, if preferred, the set screw 42 can be released to permit removal of the lamp support and lamps as a unit to a more convenient location.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. In a signal light having a vertically disposed rotating shaft, power means to drive said shaft, and a plurality of sealed beam lamps disposed about said shaft: a lamp holder mounted on said shaft for rotation therewith, said lamp holder having means to support said lamps including a pair of spaced plate members, said plate members being of substantially identical construction inversely disposed, and a plate engaging member removably secured to and axially aligned with said shaft, said plate members having equi-angularly spaced perimetrical portions shaped to embrace between said plates, respectively, upper and lower diametrically opposite portions of each lamp, and said plate engaging member having means for securing said plates in mutually spaced engagement therewith, whereby said lamps are clamped in position about said shaft.

2. Structure as defined in claim 1 wherein said plate engaging member comprises a sleeve removably mounted on said shaft, whereby said lamp support is removable as a unit from said signal light to facilitate replacement of the lamps.

3. A signal light having a light transmitting dome and a hollow base on which said dome is removably mounted, a plurality of sealed beam lamps in said dome, a rotatable shaft extending from said base into said dome, an electric motor mounted in said base for driving said shaft, and a lamp support positioned in said dome and detachably secured as a unit to said shaft for rotation therewith, said lamp support including a pair of substantially identical spaced plates each having a plurality of radially extending arms, each of said arms having a terminal means engageable with the periphery of one of said lamps to rigidly support said lamps between said spaced plates, means for securing said plates in spaced relationship on said shaft, and means for conducting current from a current source to said lamps during rotation of said lamp support including slip-ring and brush means mounted respectively on one of said plates and on said base.

4. Structure as defined in claim 3 wherein each of said lamps has an annular peripheral rim and a locator lug adjacent thereto, and at least one of said plates has terminal means on each of said arms engageable with said lugs, whereby each lamp may be properly positioned.

5. Structure as defined in claim 4 wherein said terminal means for engaging said annular rim and said lugs comprises cutaway portions in said plates.

6. Structure as defined in claim 4 wherein said terminal means for engaging said annular rims comprises annular grooves in said plates.

7. Structure as defined in claim 4 wherein said terminal means for engaging said lugs comprises shoulders formed on said plate.

8. An emergency signal light having a vertical disposed shaft, motor means for rotating said shaft, a translucent dome, a plurality of annularly-rimmed lamps supported on said shaft and within said dome for rotation with said shaft, and a lamp support comprising a shouldered support sleeve removably secured to said shaft, an upper support plate removably secured to the top of said sleeve, and a lower support plate disposed about and resting on a shoulder adjacent the bottom of said sleeve, said support plates having substantially identical, oppositely disposed, cruciform configurations, and having terminal portions slotted to engage a portion of the annular rims of said lamps, whereby four lamps are held clamped between the respective terminal portions of said plates, and said lamps and lamp support may be removed as a unit.

9. A signal light having a translucent dome, a hollow base on which said dome is removably mounted, an electric motor mounted in said base, a vertically extending shaft journalled in said base, means operatively connecting said motor and said shaft, a plurality of identical electric lamps, each having an annular rim, a support sleeve removably securde on said shaft, an upper support plate removably secured at its center to the top of said sleeve, a lower support plate disposed about and supported on said sleeve below said upper plate, each support plate having a radially extending arm for each lamp, each arm having an annular groove therein conformed to a portion of the rim of said lamp, an insulated slip-ring secured to said base about and spaced from said sleeve and connected to a current source, a first electrical connector ring disposed about said sleeve below said upper support plate, said connector ring having a portion secured to said sleeve and having tab portions connected to one terminal of each lamp, a second electrical connector ring disposed about and spaced from said sleeve below said first connector ring above said lower plate and having tab portions connected to the other terminal of each lamp, a headed tubular brush holder of nonconductive material supported in a hole in said lower plate over said slip-ring, a brush contact in said brush holder, a contact disc above said brush holder contacting said second connector ring, and spring means within said brush holder connecting and securing said disc to said brush, whereby said lamps are powered and rotated for emitting a warning light, and said lamps, support sleeve, support plates, connector rings, disc, spring, brush and brush holder may be removed as a unit for lamp replacement.

10. The light of claim 9 having lamps provided with a locating lug adjacent the rim thereof, one support arm having each arm provided with shoulders engageable with said lug, whereby each lamp may be correctly positioned.

References Cited in the file of this patent

UNITED STATES PATENTS

| | | |
|---|---|---|
| 2,578,239 | Gosswiller | Dec. 11, 1951 |
| 2,586,375 | Pennow | Feb. 19, 1952 |
| 2,645,761 | McDowell et al. | July 14, 1953 |
| 2,719,281 | Roth et al. | Sept. 27, 1955 |
| 2,762,994 | Kennelly | Sept. 11, 1956 |